June 11, 1929. J. A. McCASKELL 1,716,497
SHOCK ABSORBER
Filed March 9, 1926 3 Sheets-Sheet 1
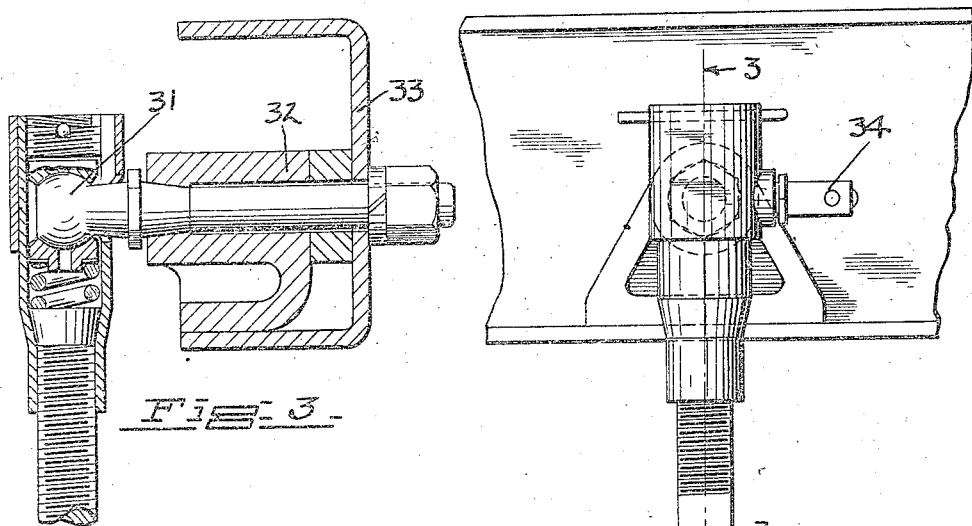
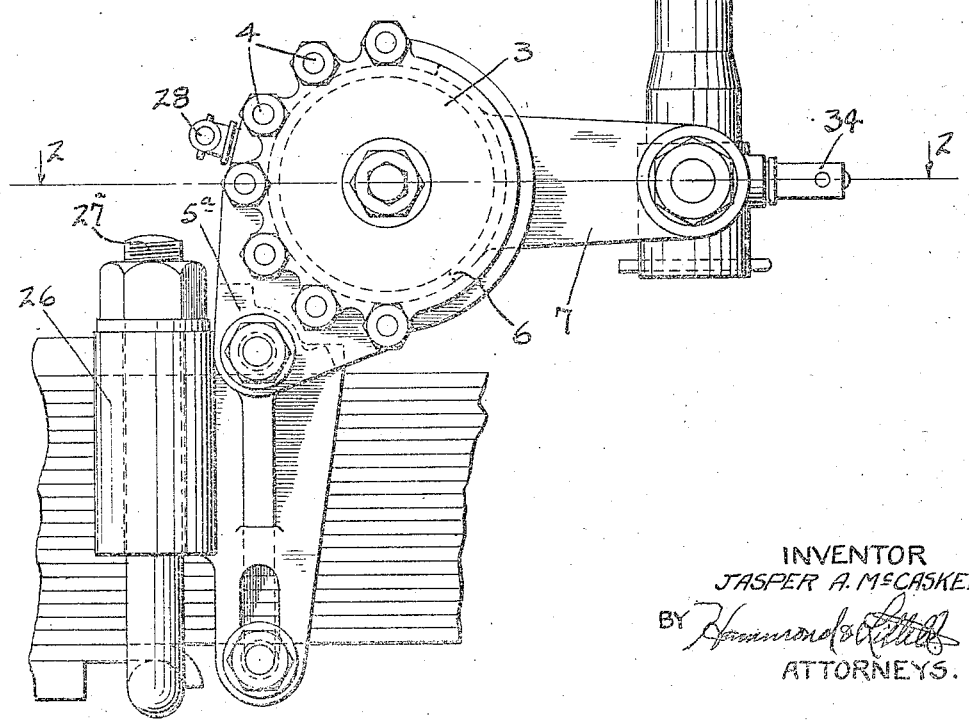
INVENTOR
JASPER A. McCASKELL
BY
ATTORNEYS.

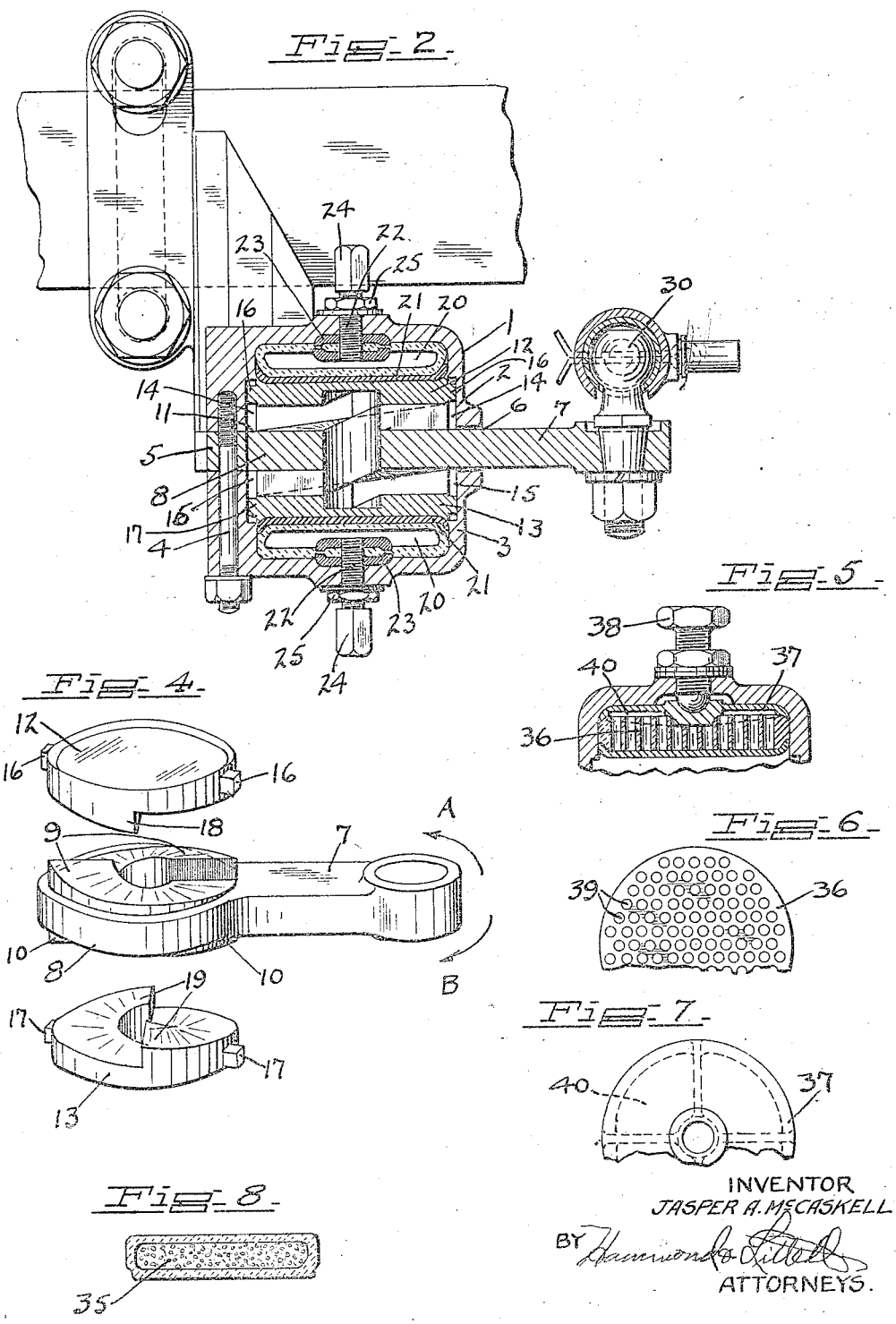

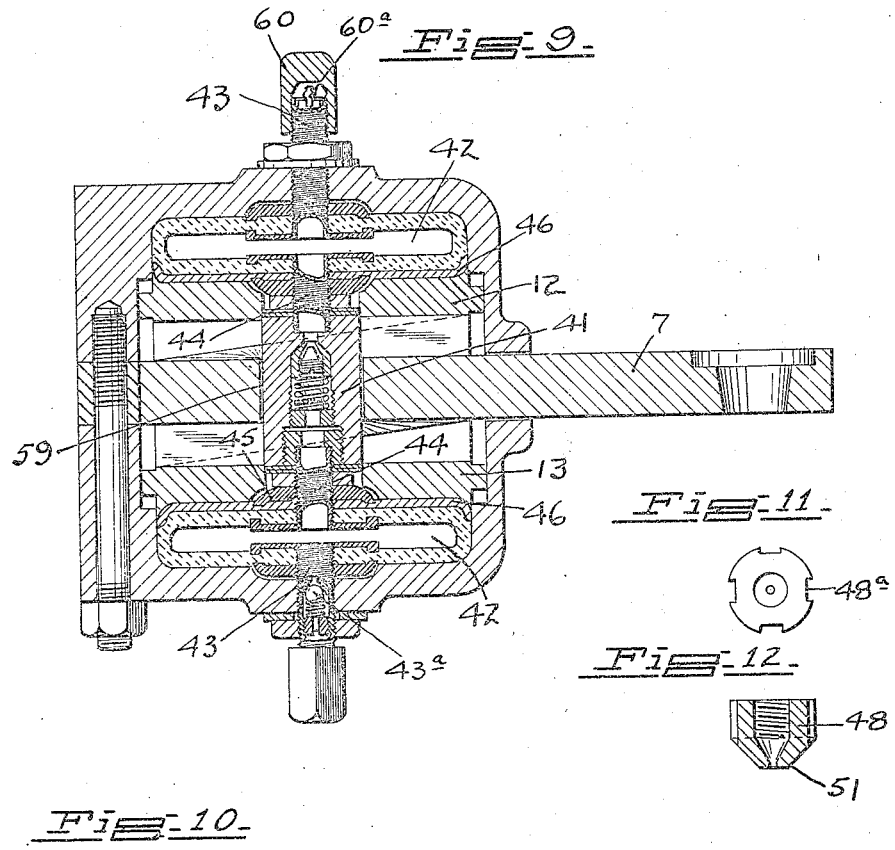
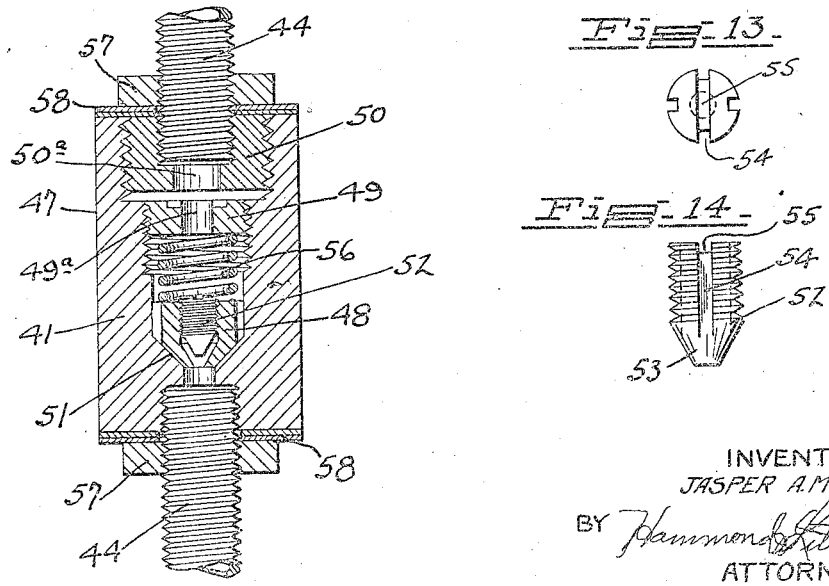

Patented June 11, 1929.

1,716,497

UNITED STATES PATENT OFFICE.

JASPER A. McCASKELL, OF SALT LAKE CITY, UTAH.

SHOCK ABSORBER.

Application filed March 9, 1926. Serial No. 93,416.

This invention relates to shock absorber of the air cushion type for vehicle springs.

One of the objects of the invention is to provide a shock absorber which will give a cumulative retarding effect in each direction of movement between the vehicle and the running gear.

Another object of the invention is to provide a shock absorber in which a different retarding effect is produced in each direction of movement between the vehicle and the running gear.

Another object of the invention is to provide a shock absorber in which the retarding effect on the relative movement between the vehicle and the running gear may be adjusted in each direction.

Another object of the invention is to provide a shock absorber having air cushions to produce the retarding effect of the movement between the vehicle and the running gear in which the air cushions reach their maximum retarding effect with a minimum compression thereof.

Another object of the invention is to provide a shock absorber having a pair of air cushions for producing the retarding effect on the relative movement between the vehicle and the running gear, and a valve between the air cushions, which will permit the air to flow easily from one cushion to another in one direction and retard the flow of air between the cushions in the opposite direction.

Another object of the invention is to provide a shock absorber which will automatically adjust itself to different loads and to vehicles of different weights.

Other objects of the invention will appear as the description proceeds.

In the drawings:

Figure 1 is a side view of the shock absorber applied to the rear spring of an automobile.

Figure 2 is a sectional plan view of the shock absorber taken on the line 2—2 of Figure 1.

Figure 3 is a sectional elevation of one of the attaching means taken on the line 3—3 of Figure 1.

Figure 4 is a perspective view of the pistons showing the cams which actuate the air drums in the shock absorber.

Figure 5 is a sectional view thru one end of the shock absorber, showing a modified form of air drum.

Figures 6 and 7 are plan views respectively of the rubber air drum and stiffener therefor, which are shown in Figure 5.

Figure 8 is a sectional view thru a modified form of air drum.

Figure 9 is a sectional view similar to the view shown in Figure 2, illustrating a modified form of shock absorber, in which a valve is used to connect the two air drums.

Figure 10 is an enlarged sectional view of the valve and valve casing shown in Figure 9.

Figures 11 and 12 are plan and sectional elevation respectively of the valve shown in Figure 10.

Figures 13 and 14 are an enlarged plan and elevation respectively of the needle valve, shown in Figures 9 and 10.

One embodiment of the invention has been illustrated in Figures 1 to 4, in which the shock absorber comprises a casing 1, formed of two cup shaped sections 2 and 3 which are adapted to be bolted together by a plurality of bolts 4, which extend half way round the circumference of the casing 1.

A filler block 5 is disposed between the two sections 2 and 3 for a portion of the distance around the circumference of the casing, leaving a space 6 between the ends thereof, to permit movement of the lever arm 7, which enters the shock absorber thru the space 6. The lever arm 7 is integrally connected to the disc 8 which has a pair of spiral cams 9 and 10 on opposite sides thereof and is adapted to rotate in a groove 11, formed by the block 5 and the edges of the sections 2 and 3.

A pair of pistons 12 and 13 are mounted for relative movement in the sections 2 and 3 respectively and are prevented from rotating therein by the lugs 16 and 17 attached to the pistons 12 and 13 respectively, which engage in the slots 14 and 15, in the sections 2 and 3 respectively.

The piston 12 has a pair of inwardly extending spiral cams 18 and the piston 13 has a pair of inwardly extending spiral cams 19 adapted to engage with the outwardly extending cams 9 and 10, attached to the disc 8. A pair of air drums 20 are disposed within the sections 2 and 3 between the pistons and the end walls thereof, and are protected from the movement of the pistons by packing 21, disposed between the air drums 20 and the pistons 12 and 13 respectively.

The valve tubes 22 are attached to the drums 20 by means of plates 23 and provide means to increase the pressure in the drums 20 when it becomes necessary to do so.

The tubes 22 may have ordinary tire air valves in them and are closed by the caps 24. Nuts 25 hold the tubes 22 rigidly in place in the walls of the sections 2 and 3. The block 5 has a projecting ear 5ª which is attached to a clamp 26, adapted to be secured to the spring of the vehicle by a U bolt 27. A grease cup 28 is attached to the casing 1, and provides means to lubricate the cams 9 and 10, 18 and 19.

The lever arm 7 is attached to a connecting rod 29, by means of a ball and socket joint 30. A second ball and socket joint 31 is attached to the upper end of the connecting rod 29 and the spacing member 32, by which the shock absorber is connected to the channel 33 forming part of the frame work of the vehicle.

The grease cups 34 are attached to the ball and socket joints 30 and 31 to provide lubrication therefor.

In operation, the device is connected between the running gear and the body portion of the vehicle as shown in Figure 1. When the spring is compressed, the lever arm 7 is caused to move downwardly and turn the disc 8 in the casing 1, which is held rigidly to the spring by the block 5, and clamp 26. The downward movement of the lever arm 7 illustrated by the arrow A in the perspective view, Figure 4, causes the cams 9 on the disc 8 to co-operate with the cams 18 on the piston 12, to cause the piston 12 to move outwardly, thereby compressing the adjacent air drum 20. At the same time, the cams 10 co-operate with the cams 19 on the piston 13 to cause the piston to move toward the centre of the shock absorber thereby releasing the air pressure in its adjacent air drum 20 causing the air drum to expand. When the spring rebounds the lever arm 7 and the disc 8 will be rotated, in the direction of the arrow B, Figure 4, and the cams 10 will co-operate with the cams 19 on the piston 13 to cause the piston 13 to move outwardly thereby compressing the adjacent air drum 20. At the same time the cams 9 co-operate with the cams 18 on the piston 12 to cause the piston 12 to move toward the center of the shock absorber and the adjacent air drum 20 to expand. It will thus be seen that with the downward movement of the lever arm 7 one of the air drums 20 is compressed and the other is expanded while with the upward movement of the lever arm 7, the operation is reversed, the first air drum expanding and the second being compressed. The retarding effect of the air drums therefore occurs on both the compression of the spring and the rebound thereof.

By introducing a greater pressure of air in one of the drums, than in the other, a greater retardation may be effected when the spring moves in one direction, than when it moves in the other. Hence by increasing the pressure in the air drum 20, which comes adjacent to the piston 13, over the pressure in the other air drum, the lever arm 7 will move downwardly with little retarding effect as the spring is compressed and will be retarded from upward movement to a greater degree by the pressure of the air in the drum adjacent the piston 13. Any desired shock absorbing effect may be produced therefore by varying the pressures in these two air drums.

In order to make the air drums 20 more efficient so that the maximum retarding effect will be produced before the drum has been compressed its maximum distance, a filler 35 of soft spungy rubber, Figure 8 may be provided. This filler will take up a portion of the space ordinarily occupied by the air, but will offer little compressive resistance and the result is that a less amount of air is actually used than with the air drum shown in Figure 2, and the air in the drum will reach its maximum compression with relatively less movement of the pistons and lever arm 7.

A further modification of the air drum is illustrated in Figure 5, in which a perforated disc 36 of soft rubber is used in place of the air drum 20. A reinforcing plate 37 rests upon the disc 36 and may be adjusted by means of the bolt 38 passing thru the wall of the shock absorber.

The disc 36 provides a plurality of openings 39, which are filled with air and when the disc is compressed the soft rubber expands closing these openings, so that the air is forced out into the space 40 above the disc and between the ribs of the plate 37 and is compressed therein. The pressure may be increased in this type of air drum by tightening bolt 38.

In Figures 9 to 14, I have illustrated another modification of my invention, in which I provide a valve 41 between the drums 42. Tubes 43 provide means to introduce the air into the drums 42 and are connected to the drums in a similar manner to the tubes 22 shown in Figure 2. The tubes 44 are connected to the opposite side of the drums 42 by means of plates 45, which engages the wall of the rubber air drum together with the protecting packing 46. The valve 41 comprises a casing 47, one end of which is bored longitudinally to receive a reciprocating valve 48, a valve retaining disc 49 and a plug 50. The reciprocating valve 48 has a tapered bottom portion 51 and the valve casing 47 is shaped to provide a seat for this tapered portion. The valve 48 is also internally bored to receive the needle valve 52, which is also tapered at 53, the bore in the valve 48 being shaped at one end to provide a seat for the tapered end 53 of the needle valve 52. The needle valve 52 has longitudinal grooves 54 upon the sides thereof, which permit the air to pass when the tapered end 53 is not contacting with its seat in the valve 48. When the valve 48 is seated in the casing 47, no air can pass thereby except such air as passes thru the bore of the valve 48 and the grooves 54 of the needle valve 52. The needle valve 52 has a groove 55 on the top thereof by which the valve may be turned to adjust the same. The retaining disc 49 is threaded and is screwed into the tapered bore of the valve casing 47 and a spring 56 is disposed between the disc 49 and the reciprocating valve 48 to hold the valve normally in its seat. The plug 50 screws into the end of the bore of the casing 47, which is still larger in diameter than that into which the disc 49 is adapted to fit, and is itself internally bored to receive one of the tubes 44. The other end of the valve casing 47 is drilled and tapped to receive the other of the tubes 44. A nut 57 is applied to each of the tubes 44 to securely lock the same in the valve casing 47 and washers 58 may be disposed between the nuts 57 and the valve casing 47. The valve 41 connecting the two drums 42 passes thru an opening 59 in the disc 8 and is free to reciprocate therein, as the disc 8 is rotated and the pistons 12 and 13 are reciprocated in the shock absorber casing.

The distance between the adjacent walls of the two air drums 42 is constant so that as the disc 8 is rotated, one or the other of the drums is compressed and the other drum is necessarily expanded, the valve casing 47 shifting longitudinally in the casing through the opening 59.

The operation of the valve is as follows:

When the lever arm 7 is forced down by compression of the spring, the air drum adjacent the piston 12 is compressed and the drum adjacent the piston 13 is expanded. The increased pressure of air in the drum adjacent the piston 12 forces the air thru the tube 44 against the reciprocating valve 48 which is caused to move against the spring 56 thereby permitting the air to escape thru the grooves 48ª in the sides thereof, up thru the opening 49ª in the disc 49, the opening 50ª in the plug 50 and the other tube 44 into the other air drum 42 adjacent the piston 13. When the spring rebounds the air drum adjacent the piston 13 is compressed and the air drum adjacent the piston 12 is expanded. This causes the air to be forced reversely thru the opening 50ª in the plug 50 and the opening 49ª in the disc 49, and against the valve 48 which is held closed thereby, leaving the space between the needle valve and its seat in the reciprocating valve 48 as the only opening thru which the air can pass into the other drum. The adjustment of the needle valve 52 therefore will determine the retardation of the air between the drums on the rebound of the spring. The needle valve 52, as well as the disc 49 may be adjusted by removing the cap 60 and introducing a screw driver thru the tube 43, the air drum 42, the tube 44, the opening 50ª in the plug 50 and in the case of the needle valve 52, the opening 49ª in the disc 49. It will thus be evident that by using this valve, any desired retardation may be effected in both directions, in the shock absorber, and adjustment may be made so that little retardation will appear on the downward movement of the spring while the spring will be gradually returned to its normal position.

By means of this valve the shock absorber will also automatically adjust itself to the weight of the vehicle body or to differences in the load of the vehicle. Thus when the load on the vehicle is increased and the springs compress, a greater pressure is applied to one air drum than to the other and the air will gradually flow toward the drum having the least pressure until the pressure is equalized between the drums. The shock absorber will then be ready to produce the same retarding effect on the action of the springs as when the vehicle was empty. The air pressure in the drums is not increased by additional load on the vehicle but the relative position of the pistons with respect to the casing is changed and therefore there is a change in degree of compression and expansion of the drums, causing the shock absorber to automatically adjust itself and give uniform snubbing action whether the vehicle is carrying a heavy load or a light load.

Another advantage of this construction is that the shock absorber may be manufactured in a single model and applied to vehicles of different body weights and the desired uniform retarding effect of the springs for each vehicle may be obtained.

If desired, the shock absorber may be arranged so that a predetermined pressure will be maintained in the drums. To accomplish this, an ordinary tire check valve 60ª may be provided in the tube 43 attached to the drum adjacent the piston 12. A relief valve 43ª may be provided in the other tube 43 attached to the drum adjacent the piston 13. The needle valve 52 may be screwed down tightly against its seat to prevent any air leaking past it and the shock absorber may be operated with the caps 60 removed. With this arrangement any up and down movement of the arm 7 will cause the pistons and drums of the shock absorber to act as a pump, pumping the air from the drum adjacent the piston 12 into the drum adjacent the piston 13. When the pressure in the former drum becomes low enough, air will be admitted through the tire valve 60ª from the atmosphere and when the pressure in the latter drum becomes large enough, the relief valve 43ª, which may be set to operate at any desired pressure, will allow air to escape therefrom. Hence any desired pressure will be maintained in the shock absorber and such pressure will be maintained even though the drums may leak a little. There is no necessity to pump up the drums at any time as a slight movement of the body of the car, causing the arm 7 to move up and down, will pump the drums up to the desired pressure.

Many changes may be made in the modifications of the invention shown in the drawings, without departing from the spirit of the invention, and I do not desire to limit myself to the specific embodiments shown, but to interpret the invention broadly within the scope of the appended claims.

I claim:

1. A shock absorber comprising a tubular chamber, a plurality of pistons in said chamber, a resilient rubber air cushion between each of said pistons and the outer wall of said chamber, cam faces on said pistons, a disc rotatably mounted between said pistons, cam faces on each side of said disc adapted to engage the cam faces on said pistons to compress one of said cushions when said disc is rotated in one direction and to compress the other of said cushions when said disc is rotated in the other direction.

2. A shock absorber comprising a tubular chamber, a plurality of pistons in said chamber, a resilient rubber air drum between each of said pistons and the outer walls of said chamber, cam faces on said pistons, a disc rotatably mounted between said pistons, cam faces on each side of said disc adapted to co-operate with the cam faces on said pistons, an arm integral with said disc, means to attach said chamber to the running gear of an automobile and means to attach said arm to the body of an automobile.

3. A shock absorber comprising a tubular chamber, a pair of pistons in said chamber, an air drum between each piston and the outer wall of said chamber, a tube connected to each air drum and protruding through the wall of said chamber, means to close the outer ends of each tube, a disc rotatably mounted between said pistons, cam faces on each side of said disc, cam faces on the inner side of each piston and adapted to engage with the cam faces on said disc to reciprocate said pistons, in said chamber when said disc is rotated, and means to rotate said disc by the relative movement between a vehicle and the running gear thereof.

4. A shock absorber comprising a tubular chamber, a pair of pistons slidably mounted in said chamber, a resilient air cushion between each piston and the outer wall of said chamber and a centrally disposed cam means to simultaneously move said pistons in the same direction when the relative position changes between a vehicle and the running gear therefor.

5. A shock absorber comprising a tubular chamber, a pair of pistons slidably mounted in said chamber, an air drum between each piston and the outer wall of said chamber, a disc rotatably mounted between said pistons, parallel cam faces on opposite sides of said disc, cam faces on the inner sides of said pistons, adapted to co-operate with the cam faces on said disc to simultaneously reciprocate said pistons when said disc is rotated, a lever arm integral with said disc, means to attach said chamber to the running gear of a vehicle and means to attach said lever arm to the body of said vehicle.

6. In a shock absorber a tubular chamber, a pair of pistons slidably mounted therein, a rubber air filled drum between each piston and the outer wall of said chamber, means to reciprocate said pistons, means located centrally of and through said pistons to permit air to pass freely in one direction between said air drums and to retard the passage of air between said drums in the other direction.

7. In a shock absorber a tubular chamber, a pair of pistons slidably mounted therein, a rubber air filled drum between each piston and the outer wall of said chamber, a double faced cam to reciprocate said pistons in the same and means to permit air to pass in one direction between said air drums when a predetermined difference in pressure between said drums has been reached and to retard the passage of air between the drums in the opposite direction.

8. In a shock absorber a tubular chamber, a pair of pistons slidably mounted in said chamber, means to reciprocate said pistons when the relative position of a vehicle and the running gear thereof changes, an air drum between each piston and the outer wall of said chamber, a tubular connection between said air drums passing through an opening in each of said pistons, a spring pressed valve in said tubular connection, having an opening therethrough, means for adjusting the tension on said valve, an adjustable needle valve in the opening in said spring pressed valve and means to vary the pressure in said air drum.

9. In a shock absorber a tubular chamber, a pair of pistons having openings through the center thereof slidably mounted in said chamber, an air drum between each piston and the outer wall of said chamber, a disc having an opening through the center thereof rotatably mounted in said chamber between said pistons, cam faces on each side of said disc, cam faces on the inner sides of said pistons adapted to co-operate with said disc cam faces to reciprocate said pistons when said disc is rotated, an arm connected to said disc, means to connect said chamber to the running gear of a vehicle, means to connect said arm to the body part of said vehicle, tubular means connecting said air drums, means within said tubular means to permit air to flow between said air drums in one direction when a predetermined difference in pressure between said air drums has been reached and to retard the passage of air in the other direction between said air drums, and means to vary the pressure in said air drums.

10. In a shock absorber, a tubular chamber, a plurality of pistons in said chamber, an air drum between each piston and the outer wall of said chamber, means to compress one of said drums when the relative movement between the vehicle and the running gear is in one direction and to compress the other of said drums when the relative movement is in the other direction and means to maintain a constant pressure in said drums.

11. In a shock absorber, a tubular chamber, a pair of pistons slidably mounted therein, an air drum between each piston and the outer wall of said chamber, means to reciprocate said pistons, means to permit air to pass in one direction between said drums and to retard the passage of air between said drums in the other direction and means to maintain a predetermined pressure in said drums.

12. A shock absorber comprising a tubular chamber, a pair of pistons slidably mounted in said chamber, an air drum between each piston and the outer wall of said chamber, means to reciprocate said pistons, a tubular connection between said air drums, spring pressed means in said tubular connection to permit air to flow in one direction between said drums and to retard the flow of air between said drums in the opposite direction and means to maintain a constant pressure in said drums.

13. In a shock absorber a tubular chamber, a pair of pistons having openings through the center thereof slidably mounted in said chamber, an air drum between each piston and the outer wall of said chamber, a disc having an opening through the center thereof rotatably mounted in said chamber between said pistons, cam faces on each side of said disc, cam faces on the inner sides of said pistons adapted to cooperate with said disc cam faces to reciprocate said pistons when said disc is rotated, an arm connected to said disc, means to connect said chamber to the running gear of a vehicle, means to connect said arm to the body part of said vehicle, tubular means connecting said air drums, means within said tubular means to permit air to flow between said air drums in one direction when a predetermined difference in pressure between said air drums has been reached and to retard the passage of air in the other direction between said air drums, a check valve connected to one of said drums communicating with the atmosphere and a relief valve connected to the other drum communicating with the atmosphere.

In testimony whereof I have affixed my signature to this specification.

JASPER A. McCASKELL.